(12) United States Patent
Jeyaram

(10) Patent No.: US 7,370,171 B1
(45) Date of Patent: May 6, 2008

(54) SCALABLE BUFFER CONTROL FOR A TRACING FRAMEWORK

(75) Inventor: Prabahar Jeyaram, Karnataka (IN)

(73) Assignee: Sun Microsystems, Inc., Santa Clara, CA (US)

( * ) Notice: Subject to any disclaimer, the term of this patent is extended or adjusted under 35 U.S.C. 154(b) by 757 days.

(21) Appl. No.: 10/831,887

(22) Filed: Apr. 26, 2004

(51) Int. Cl.
G06F 9/26 (2006.01)
G06F 9/34 (2006.01)
G06F 12/00 (2006.01)
G06F 13/00 (2006.01)
G06F 13/28 (2006.01)
G06F 13/36 (2006.01)

(52) U.S. Cl. .................... 711/170; 711/147; 711/216; 710/56; 710/310

(58) Field of Classification Search .................... None
See application file for complete search history.

(56) References Cited

U.S. PATENT DOCUMENTS

| 6,493,837 | B1 * | 12/2002 | Pang et al. .................... 714/45 |
| 6,718,445 | B1 * | 4/2004 | Lewis et al. ................. 711/159 |
| RE39,500 | E * | 2/2007 | Hansen ........................ 711/203 |
| 2002/0188831 | A1 * | 12/2002 | Jackson et al. ............. 712/227 |
| 2005/0060516 | A1 * | 3/2005 | Bottemiller et al. .......... 712/34 |

* cited by examiner

*Primary Examiner*—Donald Sparks
*Assistant Examiner*—Fred W Detschel
(74) *Attorney, Agent, or Firm*—Osha Liang LLP

(57) ABSTRACT

A method for storing a tracing event including encountering a tracing probe, selecting a probe buffer corresponding to the tracing probe, obtaining a buffer within the probe buffer using a thread identifier corresponding to a thread that encountered the tracing probe, and storing the tracing event in the buffer.

13 Claims, 4 Drawing Sheets

SCALABLE BUFFER CONTROL FOR A TRACING FRAMEWORK

BACKGROUND

The software core of a computer system (e.g., a system with one or more central processing unit (CPUs)) is generally referred to as the kernel of the computer system. The kernel includes an interrupt handler to handle requests for resources provided by the computer system and a scheduler that determines the order of the execution of various processes within the resources of the computer system. Additionally, the computer system may include a kernel tracing framework for tracing events performed by processes in the kernel.

Conventionally, the kernel tracing framework provides a set of programs and application program interfaces (APIs) that may be used to present an overview of the performance of any part of the kernel. The kernel tracing framework is also used to debug or observe operations within the kernel.

Typically, multiple threads are executing simultaneously within the system. When the kernel tracing framework is activated a tracing event (i.e., stores data regarding tracing events) is recorded whenever one of the threads executing in the system encounters a trace point (i.e., a point in the execution path of the thread at which data about the state of the kernel, etc. is collected) during executing. The tracing framework typically uses a global buffer (i.e., shared resource used by all the CPUs and kernel subsystems within the computer system) to record the tracing event. Based on the requests from the various threads, tracing event data is recorded sequentially into the global buffer. Once the global buffer becomes full, the global buffer is marked as such, and a new global buffer is allocated from the computer system memory resources.

Conventionally, in order to protect the global buffer from multiple threads storing data (i.e., tracing events) simultaneously, each thread obtains a lock for the global buffer prior to using the global buffer. The lock allows only the thread that obtained the lock to store data in the global buffer. Once the tracing event data is recorded in the global buffer, the thread releases the lock, thereby allowing another thread to obtain the lock and record tracing event data in the global buffer.

The thread that obtains the lock typically prevents other threads from accessing the global buffer for the amount of time needed to record tracing event data. In some instances, allowing only one thread to update the global buffer with tracing event data causes accesses to the buffer to become serialized. In other words, a thread that wants to record an event may be blocked from using the global buffer until the lock protecting the global buffer is released.

SUMMARY

In general, in one aspect, the invention, a method for storing a tracing event comprising encountering a tracing probe, selecting a probe buffer corresponding to the tracing probe, obtaining a buffer within the probe buffer using a thread identifier corresponding to a thread that encountered the tracing probe, and storing the tracing event in the buffer.

In general, in one aspect, the invention relates to a method for allocating a buffer comprising segmenting a global buffer into a plurality of CPU buffers, segmenting each of a plurality of CPU buffers into at least one probe buffer, segmenting the at least one probe buffer into a plurality of indices, wherein each of the plurality of indices is associated with at least one thread, and associating the buffer with each of the plurality of indices.

In general, in one aspect, the invention relates to an apparatus for storing a first tracing event comprising a first central processing unit (CPU), an instrumented program comprising a tracing probe, wherein the tracing probe comprises a probe name, a first thread configured to execute the instrumented program on the first CPU and generate the first tracing event, wherein the first thread comprises a first thread identifier, and a global buffer configured to store the first tracing event, wherein the global buffer is segmented into at least one CPU buffer, the at least one CPU buffer is further segmented into at least one probe buffer using the probe name, and the at least one probe buffer comprises at least one index, and wherein the at least one index is associated with a buffer.

In general, in one aspect, the invention relates to a computer system for balancing interrupts comprising a processor, a memory, a storage device, and software instructions stored in the memory for enabling the computer system under control of the processor, to: encounter a tracing probe, select a probe buffer corresponding to the tracing probe, obtain a buffer within the probe buffer using a thread identifier corresponding to a thread that encountered the tracing probe, and store the tracing event in the buffer within the probe buffer.

Other aspects of the invention will be apparent from the following description and the appended claims.

DETAILED DESCRIPTION

Figure 1:
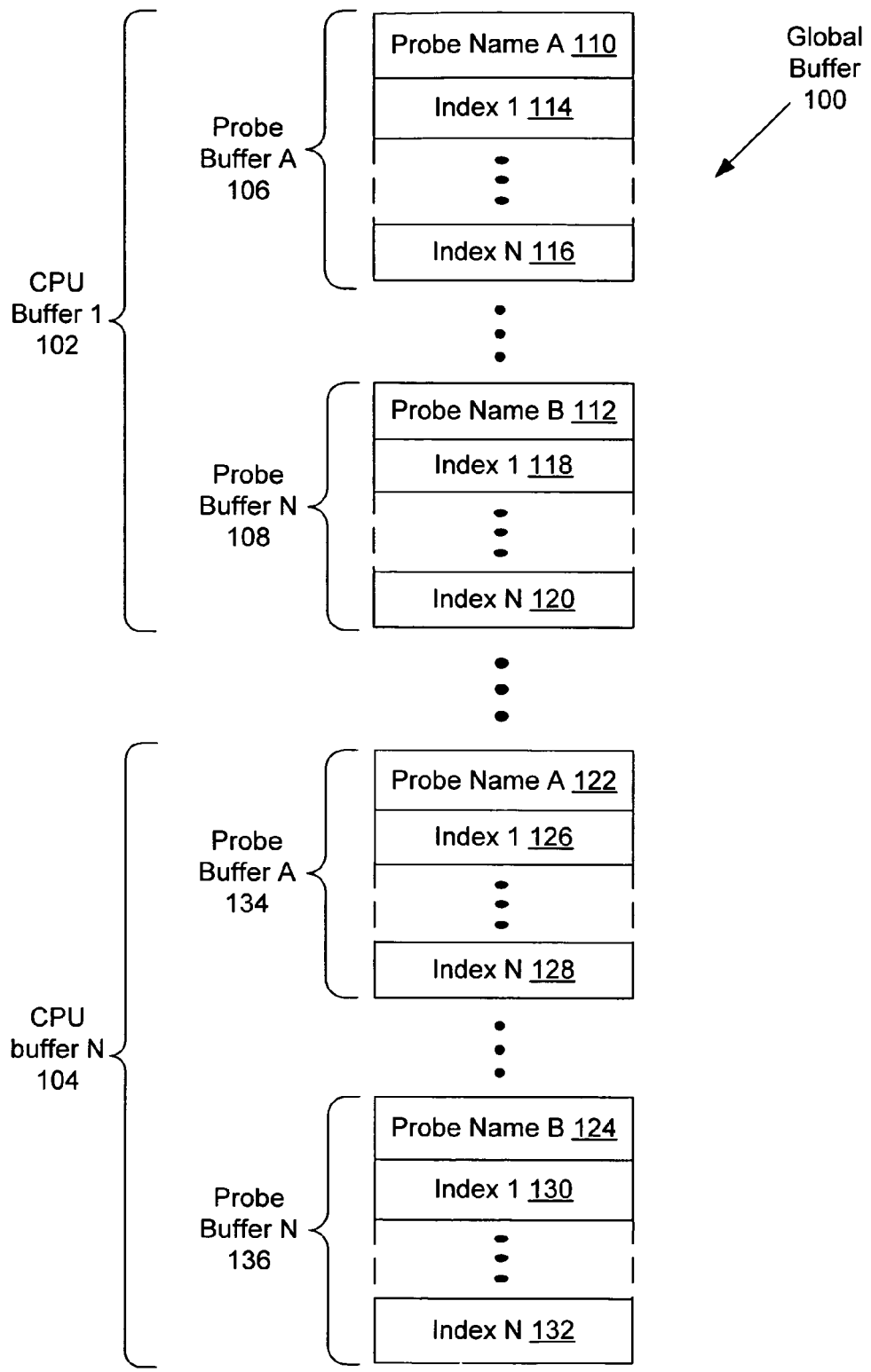
FIG. 1 shows a buffer configured to store a tracing event in accordance with an embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a scalable method and apparatus to record tracing event data in a buffer. More specifically, embodiments of the invention relate to segmenting a global buffer into several buffer pools, which are allocated to each CPU in the system. Further, embodiments of the invention relate to using a hash function to access indices referencing small buffers within the individual buffer pools to store tracing event data.

Typically, a tracing framework running on a system involves an instrumented program, which includes tracing probes placed at specific points within the instrumented program (i.e., trace points) in order to debug or gather data at those specific locations. Moreover, each tracing probe is identified by a probe name. As threads running in the kernel of the system trace the instrumented program, one or more threads may encounter a tracing probe. When the thread encounters a tracing probe, tracing event data associated with the tracing probe is collected and subsequently stored in a global buffer.

FIG. 1 shows a buffer configured to store a tracing event in accordance with one embodiment of the invention. As noted above, tracing events are typically stored in a global buffer (100) allocated to the tracing framework. In one embodiment of the invention, the global buffer (100) is segmented into several buffer pools called CPU buffers (i.e., CPU Buffer 1 (102), CPU Buffer N (104)). Each CPU buffer (102, 104) corresponds to a particular CPU within the system (i.e., CPU Buffer 1 (102) corresponds to CPU 1, and CPU Buffer N (104) corresponds to CPU N). Moreover, each CPU buffer (102, 104) is further segmented into probe buffers (i.e., Probe Buffer A (106), Probe Buffer N (108)). Each probe buffer within the CPU buffer corresponds to a tracing probe within the instrumented program. Further, each probe buffer (106, 108) includes several indices, where each index references a small portion of the buffer pool (described in FIG. 2). The buffer referenced by each index is used by one or more threads to store tracing events.

Although not shown in FIG. 1, in one embodiment of the invention, along with one or more probe buffers, each CPU buffer (102, 104) also includes an operations flag, which provides information regarding the current process of the tracing framework. For example, the operations flag may indicate that the tracing process is initializing a buffer, storing tracing events to a buffer, de-allocating a buffer, etc. The information indicated by the operations flag may be used by a system user (e.g., a system administrator) to determine what the tracing framework is doing during a particular CPU cycle.

As noted above, each CPU buffer (102, 104) includes at least one probe buffer (106, 108) for each tracing probe placed in the instrumented program. In one embodiment of the invention, each probe buffer (106) includes a probe name (i.e., Probe Name A (110), Probe Name B (112)) and several indices (114, 116, 118, 120). The probe name (110, 112) indicates the name of the tracing probe associated with the probe buffer (106, 108). For example, if there are two tracing probes, e.g., Probe A and Probe B, placed in the instrumented program, then each CPU buffer (102, 104) includes two probe buffers (i.e., a probe buffer associated with Probe A and a probe buffer associated with Probe B).

In one embodiment of the invention, each index (114, 116, 118, 120) within the probe buffer (106, 108) is accessed by a thread using a hash function. Thus, an index (114, 116, 118, 120) within the probe buffer (106, 108) may also be thought of as a hash bucket. In one embodiment of the invention, each CPU in the system includes a hash table, which may be used to select a particular index within the probe buffer (106, 108). More specifically, a hash function is applied to the thread identifier (ID) of the thread that encounters a tracing probe in the instrumented program. The result of the hash function applied to the thread ID is used to select an index (e.g., Index 1 (114)-Index N (116)) within the particular probe buffer (106, 108) associated with the tracing probe encountered.

One skilled in the art will appreciate that while the aforementioned discussion of FIG. 1 above only refers to the probe buffers and indices of CPU buffer 1 (102), CPU buffer N (104) also includes similar elements. Specifically, CPU buffer N (104) also includes at least one probe buffer (134, 136) and each probe buffer (134, 136) includes a probe name (122, 124) and several indices (126, 128, 130, 132).

Figure 2:
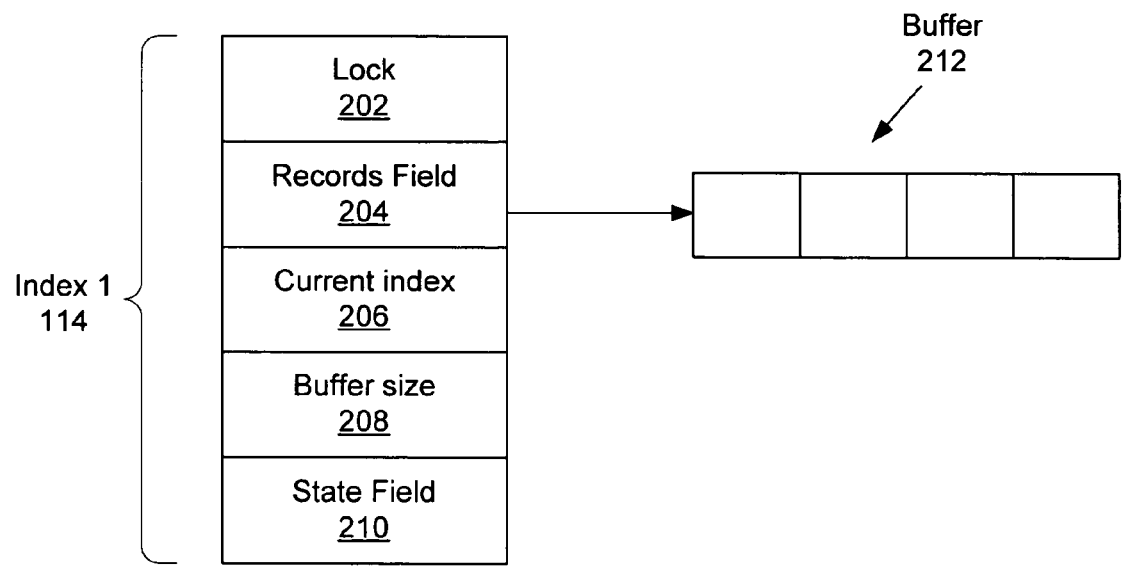
FIG. 2 shows an expanded view of an index in accordance with an embodiment of the invention.

FIG. 2 shows an expanded view of an index (114) within the probe buffer in accordance with an embodiment of the invention. Each index may include a lock (202), a records field (204), a current index (206), a buffer size (208), and a state field (210). The records field (204) references a buffer (212) allocated to the index (114). The buffer (212) is used by threads to store tracing events associated with tracing probes encountered in the instrumented program. In one embodiment of the invention, the buffer (212) may be allocated from the corresponding CPU.

In one embodiment of the invention, the state field (210) indicates the state of the records field (204) with respect to the buffer (212). For example, the state field (210) may indicate that the buffer is free, uninitialized, or full. More specifically, if the buffer (212) referenced by the records field (204) is free (i.e., the records field references a NULL pointer) then a buffer (212) is not allocated to the index (114). Alternatively, the state field (210) may indicate that a buffer (212) is allocated to the index (114) but the buffer (212) is not initialized (i.e., the buffer (212) is not ready to store tracing events). Additionally, the state may indicate that a buffer (212) is allocated to the index (114) and the buffer (212) is ready to store tracing events (i.e., the buffer is initialized).

Further, the index (114) includes a current index (206). The current index (206) tracks the particular location within the buffer (212) where tracing events may be stored. For example, when the buffer (212) is initialized, the current index is set to zero because no tracing events are stored in the buffer (212). Alternatively, if tracing events are stored in the buffer (212) then the current index indicates the next available location within the buffer (212) where a next tracing event may be recorded. As noted above, a possible state field (210) may indicate that the buffer (212) is full. To determine whether the buffer is full, the current index (206) may be compared to the buffer size (208). The buffer size (208) indicates the size of the buffer (212) allocated to the index (114). The buffer size (208) may change, for example, when the buffer (212) becomes full and a new buffer is allocated to the index (114).

In one embodiment of the invention, the index (114) may also include a lock (202). The lock (202) is used when the buffer is being recycled (i.e., deallocated to CPU buffer). The buffer (212) is typically recycled when the buffer (212) becomes full. In the case where the state field (210) indicates that the buffer (212) is full, before a thread recycles and reallocates a new buffer to the index (114), the thread may obtain a lock (202) for the buffer (212). Thus, recycling buffers (212) is a serialized process that only one thread may handle at any given time.

Further, in one embodiment, the lock (202) may be used to protect the buffer (212) (while the buffer is in use). For example, if a second thread hashes into the same index (114) that a first thread already accessed, the second thread is made aware that the buffer (212) is already in use. The second thread may then attempt to access another index (114) within the same probe buffer.

Figure 3:
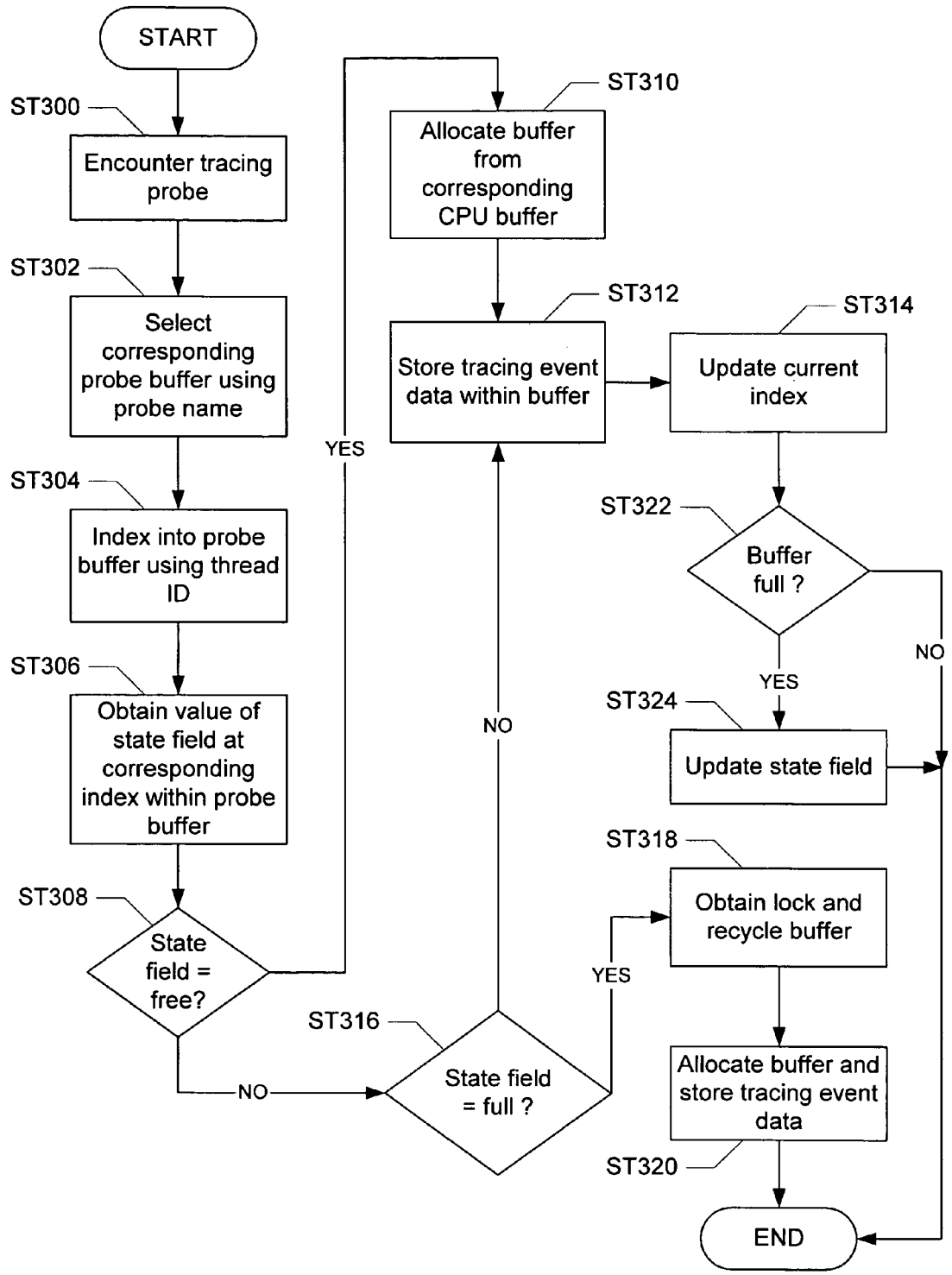
FIG. 3 shows a flow chart for storing a tracing event in accordance with an embodiment of the invention.

FIG. 3 shows a flow chart for storing a tracing event in accordance with one embodiment of the invention. Initially, a tracing probe is encountered by a thread executing in the kernel of the system (ST 300). Subsequently, a probe buffer is selected that corresponds to the name of the tracing probe encountered by the thread (ST 302). In one embodiment of the invention, the probe buffer resides in the portion of the global buffer (i.e., the CPU buffer) that corresponds to the CPU on which the thread is executing. In one embodiment of the invention, once the probe buffer is selected, a hash function is applied to the thread ID corresponding to the thread that encountered the tracing probe. The result of the hash function is used to obtain an index within the probe buffer (ST 304). One skilled in the art will appreciate that several other algorithms may be applied in order to select a particular index within the probe buffer.

In one embodiment of the invention, if the index obtained using the result of applying the hash function to the thread ID is already in use by another thread (e.g., as indicated by the lock within the index), then attempts are made to access a free index (i.e., starting at the next index from the one selected by using the hash function). Once a free index is found, the value in the state field of the corresponding index is obtained (ST 306). If the value of the state field is free (i.e., there is no buffer referenced by the index) (ST 308), then a buffer is allocated from the CPU buffer in which the probe buffer is located. As part of the buffer allocation, the buffer is also initialized (i.e., the current index points to zero) (ST 310). The tracing event is subsequently stored in the buffer (ST 312) and the current index is updated to reflect the data stored in the buffer (ST 314).

Alternatively, if the value of the state field is not free (i.e., the buffer is already allocated for the particular index) (ST 308), then the state field is analyzed to determine whether the buffer is full (ST 316). If space is available in the buffer, then the tracing event is stored in the buffer at the value specified by the current index. Similar to the process described above, once the tracing event is stored, the current index is updated (ST 312-314).

Alternatively, if the buffer is full (e.g., the value of current index and buffer size are equal), then the buffer is recycled (i.e., de-allocated) (ST 318). In one embodiment of the invention, the thread may obtain a lock for the buffer so that the recycling is performed in a serialized manner (i.e., no other thread may recycle the buffer at the same time). A new buffer is subsequently allocated from the corresponding CPU buffer and used to store the tracing event (ST 320). In one embodiment of the invention, a full buffer may also be recycled by allocating a larger buffer size to the index and copying the tracing event data stored in the full buffer to the newly allocated larger buffer.

In one embodiment of the invention, once the tracing event has been stored in the buffer, the thread may check to determine whether the buffer is full. In other words, even though there was enough space for the thread to store a tracing event, the storage of the last tracing event may cause the buffer to become full. The current index and the buffer size values within the index of the probe buffer may be compared to determine whether the buffer is full (Step 322). If the buffer is full, the value of state field is updated to reflect that space is not available in the buffer. Therefore, when the next thread selects that particular index, the thread may recycle the buffer and then allocate a new buffer.

Figure 4:
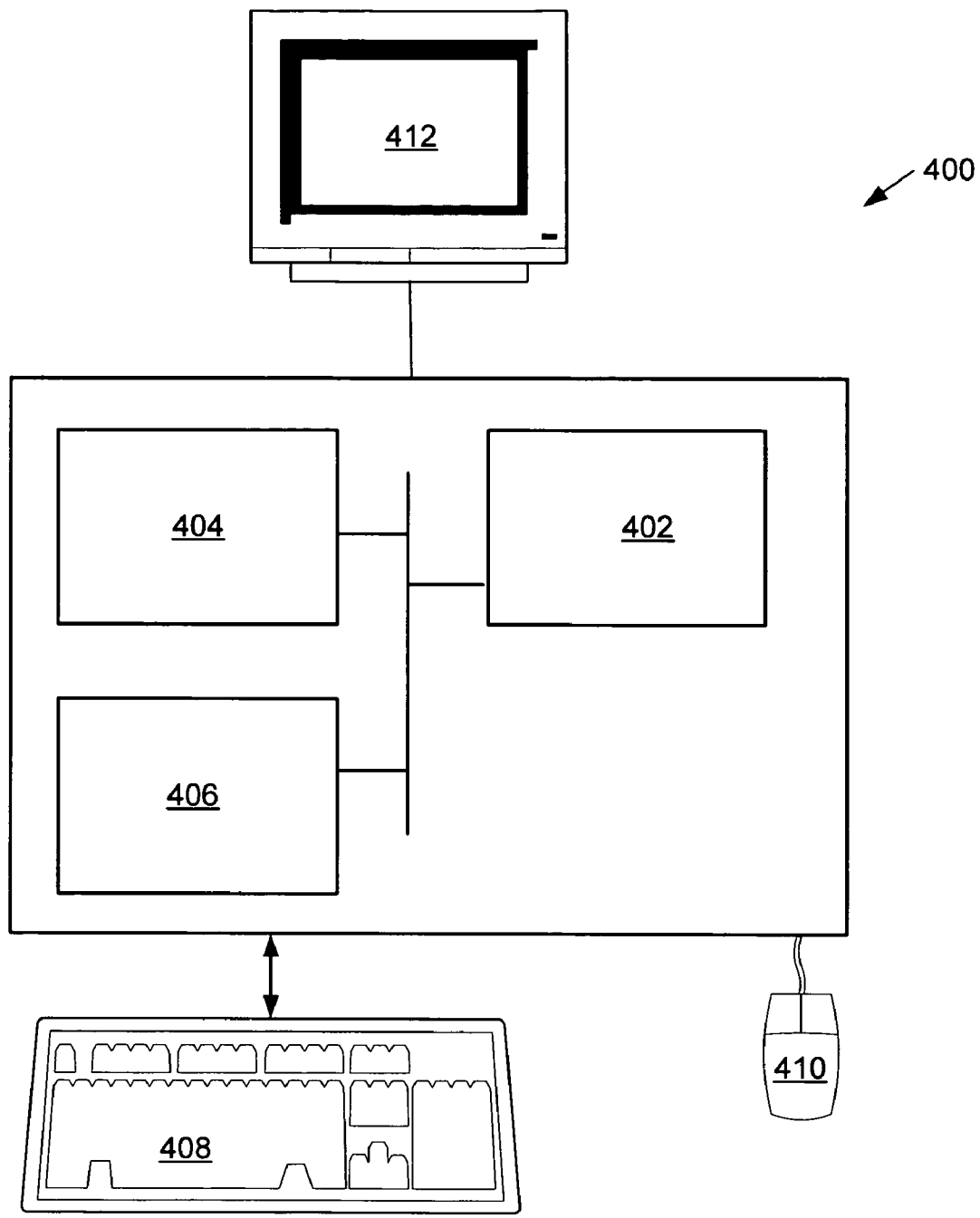
FIG. 4 shows a computer system in accordance with an embodiment of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) (not shown) via a network interface connection (not shown).

Those skilled in the art will appreciate that these input and output means may take other forms. Further, those skilled in the art will appreciate that one or more elements of the aforementioned computer (400) may be located at a remote location and connected to the other elements over a network. Though not shown in FIG. 4, embodiments of the invention may execute on multiprocessor systems (e.g., 2-CPU systems, 4-CPU system, etc.) executing multiple threads.

Embodiments of the invention may include the ability to reduce the bottleneck of storing tracing event data by segmenting a global buffer into several CPU buffers allocated to each CPU. Additionally, segmenting the CPU buffers into probe buffers, which reference a smaller set of buffers, that store tracing events provides additional granularity. In this manner, several threads may access and store tracing events in simultaneously by accessing different indices within probe buffers. Additionally, the invention provides a scalable method to store tracing event data. In other words, as more CPUs are added to the system, and an increased number of threads are running processes within the kernel of the system (i.e., a simultaneous multi-thread environment), storing tracing events may not decrease the overall performance of the system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing a tracing event comprising:
 encountering a tracing probe;
 selecting a probe buffer corresponding to the tracing probe, wherein the probe buffer is located within a corresponding central processing unit (CPU) buffer pool, wherein the CPU buffer pool is assigned to one of a plurality of CPUs;
 obtaining a buffer within the probe buffer using a thread identifier corresponding to a thread that encountered the tracing probe, wherein the buffer within the probe buffer is obtained by applying a hash function to the thread identifier to obtain an index within the probe buffer, wherein the index references the buffer; and
 storing the tracing event in the buffer obtained using the index.

2. The method of claim 1, further comprising:
 determining whether the buffer within the probe buffer is full;
 recycling the buffer within the probe buffer if the buffer within the probe buffer is full;
 if the buffer within the probe buffer is not full:
  storing the tracing event at the index; and
  updating the index corresponding to the buffer within the probe buffer.

3. The method of claim 2, wherein recycling the buffer within the probe buffer further comprises:
 obtaining a lock for the buffer within the probe buffer;
 de-allocating the buffer within the probe buffer;
 obtaining a new buffer within the probe buffer; and
 updating the index to reference the new buffer within the probe buffer.

4. The method of claim 1, wherein the index comprises:
 a records field configured to reference the buffer within the probe buffer;
 a current index field configured to track a location within the buffer; and a state field configured to indicate the state of the buffer within the probe buffer.

5. The method of claim 4, wherein the index further comprises:
a lock field configured to indicate whether the buffer within the probe buffer is in use; and
a buffer size field configured to store the size of the buffer within the probe buffer.

6. The method of claim 4, wherein a value of the state field comprises at least one state selected from the group consisting of uninitialized, fill, and free.

7. An apparatus for storing a first tracing event comprising:
a first central processing unit (CPU);
an instrumented program comprising a tracing probe, wherein the tracing probe comprises a probe name;
a first thread configured to execute the instrumented program on the first CPU and generate the first tracing event, wherein the first thread comprises a first thread identifier; and
a global buffer configured to store the first tracing event, wherein the global buffer is segmented into at least one CPU buffer, wherein the at least one CPU buffer is associated with the first CPU, and the at least one CPU buffer is further segmented into at least one probe buffer using the probe name, and the at least one probe buffer comprises at least one index, and
wherein the at least one index is associated with a buffer located within the probe buffer, wherein the buffer within the probe buffer is obtained by applying a hash function to the first thread identifier to obtain the at least one index, wherein the index references the buffer.

8. The apparatus for claim 7, further comprising:
a second CPU; and
a second thread configured to execute the instrumented program on the second CPU and generate the second tracing event, wherein the second thread comprises a second thread identifier;
wherein the global buffer is configured to store the second tracing event.

9. The apparatus of claim 7, wherein the thread identifier is used to access the at least one index.

10. The apparatus of claim 7, wherein the at least one index comprises:
a records field configured to reference the buffer;
a current index field configured to track a location within the buffer; and
a state field configured to indicate the state of the buffer.

11. The apparatus of claim 10, wherein the at least one index further comprises:
a lock field configured to indicate whether the buffer is in use; and
a buffer size field configured to store the size of the buffer.

12. The apparatus of claim 10, wherein a value of the state field comprises at least one state selected from the group consisting of uninitialized, full, and free.

13. A computer system for balancing interrupts comprising:
a processor;
a memory;
a storage device; and
software instructions stored in the memory for enabling the computer system under control of the processor, to:
encounter a tracing probe;
select a probe buffer corresponding to the tracing probe, wherein the probe buffer is located within a corresponding central processing unit (CPU) buffer pool, wherein the CPU buffer pool is assigned to one of a plurality of CPUs;
obtain a buffer within the probe buffer using a thread identifier corresponding to a thread that encountered the tracing probe, wherein the buffer within the probe buffer is obtained by applying a hash function to the thread identifier to obtain an index within the probe buffer, wherein the index references the buffer; and
store the tracing event in the buffer within the probe buffer.

* * * * *